United States Patent Office 3,210,385
Patented Oct. 5, 1965

3,210,385
2,19-CYCLO-1,3-DIKETO AND 10α-19-OIC ACID DERIVATIVES OF THE ANDROSTANE AND PREGNANE SERIES
Alexander D. Cross, Mexico City, Mexico, assignor to Syntex Corporation, Panama, Panama, a corporation of Panama
No Drawing. Filed Jan. 10, 1963, Ser. No. 250,480
22 Claims. (Cl. 260—397.1)

The present invention relates to novel cyclopentanophenanthrene derivatives and to a process for the production thereof.

More particularly the present invention relates to novel 2,19-cyclo-1,3-diketo derivatives of the androstane and pregnane series and to novel 10α-androstan-19-oic and 10α-pregnan-19-oic acids.

The novel compounds of the present invention are represented by the following formulae:

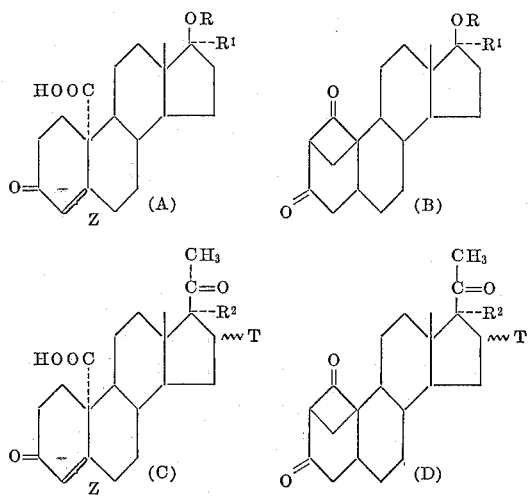

In the above formulae Z represents a double bond or a saturated linkage between C-4 and C-5; R represents hydrogen or a hydrocarbon carboxylic acyl group of less than 12 carbon atoms; $R^1$ represents hydrogen or lower alkyl; $R^2$ represents hydrogen, hydroxyl, or a hydrocarbon carboxylic acyloxy group of less than 12 carbon atoms; T represents hydrogen, α or β-methyl or α-hydroxyl; $R^2$ and T together in the 16α,17α positions represent

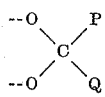

wherein P and Q, each, may be hydrogen or a lower hydrocarbon residue of up to 8 carbon atoms which may be saturated or unsaturated, of straight branch, cyclic or cyclic aliphatic chain, or aromatic, such as a lower alkyl group, e.g. methyl, ethyl, isopropyl and the like, a lower aryl group, for example, phenyl, tolyl, and the like, a lower aralkyl group e.g. benzyl and the like.

The acyl and acyloxy groups are derived from hydrocarbon carboxylic acids containing less than 12 carbon atoms which may be saturated or unsaturated, of straight, branched cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above Formulae A and B are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The compounds represented by the above Formulae C and D are powerful progestational agents with good oral activity. In addition, they have anti-androgenic, anti-gonadotrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The novel compounds of the present invention may be prepared by the process exemplified by the following scheme:

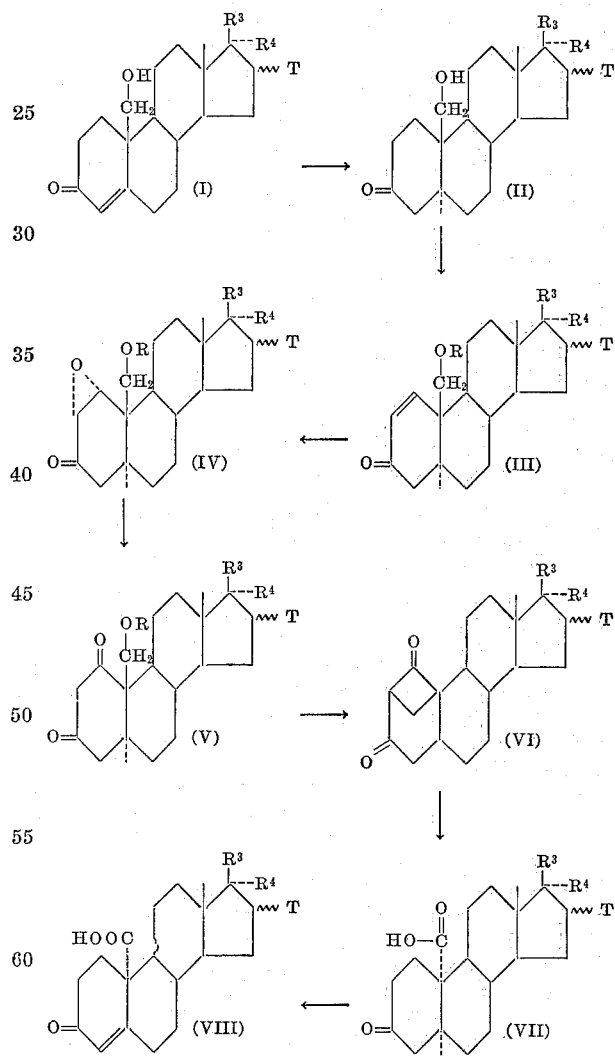

In the above formulae R and T have the same meaning hereinbefore set forth; $R^3$ represents a hydroxyl group, an acyloxy group, a 1'-acyloxy-ethyl(1') group, a 1'-hydroxyl-ethyl(1') group, or an acetyl group; $R^4$ represents hydrogen, a hydroxyl group, an acyloxy group or a lower alkyl group, $R^3$ and $R^4$ together represent a dihydroxy acetone side chain preferably protected with a 17,20;20,21-bismethylenedioxy grouping; $R^4$ and T together have the same meaning as set forth hereinbefore for $R^2$ and T together.

In practicing the process outlined above, the starting compound (I), which belongs to the androstane or pregnane series, and is prepared by the procedures descirbed in Bowers, U.S. Patent application Serial No. 201,802, filed June 12, 1962, now U.S. Patent No. 3,145,202, and in Bowers et al. J. Am. Chem. Soc. 84, 3204 (1962), from the corresponding $3\beta$-acetoxy-$\Delta^5$ compound, by treatment with hypobromous acid, reaction of the resulting $5\alpha$-bromo-$6\beta$-hydroxy compound with lead tetraacetate, treatment of the obtained $3\beta$-acetoxy-$5\alpha$-bromo-$6\beta$-,19-oxido with zinc in a lower alkanol, conventional saponification of the resulting $3\beta$-acetoxy-19-hydroxy $\Delta^5$-steroid, and finally conversion of the obtained 3,19-dihydroxy-$\Delta^5$-steroid into the desired 19-hydroxy-$\Delta^4$-3-ketone (I) by selective Oppenauer oxidation (10 minutes), is hydrogenated in the presence of a suitable catalyst such as 5% palladium on carbon to give the corresponding 19-hydroxy-3-keto steroid (II). Treatment of the latter steroid with approximately 1 molar equivalent of bromine in the presence of hydrogen bromide, followed by dehydrobromination of the obtained $\alpha$-bromo compound, preferably by reflux with a tertiary amine such as $\gamma$-collidine, yields the corresponding $\Delta^1$-3-keto steroid (III). The latter steroid is treated with hydrogen peroxide in the presence of sodium hydroxide at approximately 0–15° C. for a period of time of the order of 12 hours thus affording the corresponding $1\alpha,2\alpha$-oxido-steroid-19-ol-3-ketone (IV; R=H) which upon conventional acylation in pyridine, preferably with the theoretical amount of acylating agent. e.g., acetic anhydride, affords the corresponding $1\alpha,2\alpha$-oxido-steroid-19-ol-3-one acylate (IV: R=acyl). The last named acylate (IV: R=acyl) upon treatment with boron trifluoride etherate, in a suitable anhydrous non-polar organic solvent, such as benzene, preferably at reflux temperature for a period of time of the order of 1 hour, affords the corresponding 1,3-diketo-19-acyloxy steroid (V). The same steroid (V) may be obtained by treatment of the corresponding 19-acyloxy $1\alpha,2\alpha$-oxido-3-ketone (IV: R=acyl) with a double metal hydride, preferably with sodium borohydride under anhydrous conditions to give the corresponding $1\alpha,3\beta$-dihydroxy-19-acyloxy compound which upon oxidation under conventional conditions such as chromium trioxide in pyridine affords the desired 1,3-diketo-19-acyloxy-steroid (V). Treatment of the latter steroid with a strong base such as an alkali metal hydroxide, for example sodium hydroxide or potassium hydroxide, an alkali metal lower alkoxide, e.g., sodium methoxide, or an alkali metal amide such as potassium amide, in an suitable solvent preferably a polar solvent such as a lower alkanol, e.g., ethanol, preferably at reflux temperature for a period of time of about 3–4 hours, yields the corresponding 2,19-cyclo-steroid-1,3-dione (VI). The latter steroid upon treatment with a strong basic medium such as concentrated solutions of an alkali metal hydroxide, e.g., potassium hydroxide or sodium hydroxide in polar solvents such as water, lower alkanols and the like, preferably at reflux temperature for a period of time of the order of 24 hours, produces the corresponding $10\alpha$-steroid-3-one-19-oic acid (VII). The latter saturated keto acid upon bromination with approximately 2 molar equivalents of bromine in the presence of hydrogen bromide, followed by treatment first with a sodium iodide and second with chromous chloride, yields the corresponding $\Delta^4$-3-keto-19-oic acid (VIII).

The pregnane compounds prepared by the foregoing processes, having a $20\beta$-hydroxyl group, may be oxidized conventionally to the corresponding 20-ketones, preferably with Jones' reagent (8 N chromic acid).

The compounds of the present invention having a secondary hydroxyl group, for example in C-$17\beta$, are conventionally acylated in pyridine with a suitable acylating agent, such as a chloride or an anhydride of a hydrocarbon carboxylic acid of the type defined hereinbefore, thus affording the corresponding acylates.

The compounds of the present invention having in the molecule a tertiary hydroxyl group, e.g., at C-$17\alpha$, are conventionally esterified in the presence of p-toluenesulfonic acid with an acylating agent, such as acetic anhydride, caproic anhydride, cyclopentylpropionic anhydride or enanthic anhydride, to produce the corresponding esters.

The compounds of the present invention having a $16\alpha,17\alpha$-ketonide grouping, yield the corresponding $16\alpha,17\alpha$-diols by conventional treatment with an acid, such as acetic acid. The obtained diols, upon conventional esterification in pyridine with an acylating agent, as for example acetic anhydride or caproic anhydride, afford the corresponding acylates.

The latter $16\alpha,17\alpha$-diols upon conventional condensation with a ketone or aldehyde, such as benzaldehyde,, acetophenone, methyl-ethyl ketone, acetone and the like, in the presence of an acid yield the corresponding $16\alpha,17\alpha$-methylenedioxy derivatives, wherein the substituents in the methylenedioxy group may be different from those of the previously hydrolyzed ketonide grouping.

The following specific examples serve to illustrate, but are not intended to limit the scope of the present invention.

PREPARATION 1

A solution of 2 g. of sodium borohydride in 30 cc. of methanol was added with stirring to a solution of 2 g. of the known 19-hydroxy progesterone in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave $\Delta^4$-pregnene-$3\beta,19,20\beta$-triol.

A mixture of 1 g. of the latter compound in 20 cc. of dioxane, and 1.1 molar equivalents of 2,3-dichloro, 5,6-dicyano-1,4-benzoquinone was kept at room temperature, for 3 hours. The hydroquinone formed during the reaction was filtered off, and the filtrate evaporated to dryness. The residue was dissolved in acetone and filtered through 20 g. of alumina. Crystallization from acetone hexane gave $\Delta^4$-pregnene-19,$20\beta$-diol-3-one.

The compounds listed hereinafter under A, obtained by the procedures described in Bowers U.S. pat. appl. Ser. No. 201,802, filed June 12, 1962, and in Bowers et al. J. Am. Chem. Soc. 84, 3204, (1962), from the corresponding $3\beta$-acetoxy-$\Delta^5$ compounds, by treatment with hypobromous acid, reaction of the resulting $5\alpha$-bromo-$6\beta$-hydroxy compound with lead tetraacetate, treatment of the obtained $3\beta$-acetoxy-$5\alpha$-bromo-$6\beta$,19-oxide with zinc in a lower alkanol, conventional saponification of the resulting $3\beta$-acetoxy-19-hydroxy-$\Delta^5$-steroid, and finally conversion of the obtained 3,19-dihydroxy-$\Delta^5$-steroid into the corresponding 19-hydroxy-$\Delta^4$-3-ketone by selective Oppenauer oxidation (10 minutes), were treated by the foregoing techniques, thus affording the corresponding products set forth under B.

| A | B |
| --- | --- |
| $16\alpha$-methyl-$\Delta^4$-pregnen-19-ol-3,20-dione. | $16\alpha$-methyl-$\Delta^4$-pregnene-19,$20\beta$-diol-3-one. |
| $16\beta$-methyl-$\Delta^4$-pregnen-19-ol-3,20-dione. | $16\beta$-methyl-$\Delta^4$-pregnene-19,$20\beta$-diol-3-one. |
| $16\alpha,17\alpha$-isopropylidenedioxy-$\Delta^4$-pregnen-19-ol-3,20-dione. | $16\alpha,17\alpha$-isopropylidenedioxy-$\Delta^4$-pregnene-19,$20\beta$-diol-3-one. |
| 17-acetate of $\Delta^4$-pregnene-$17\alpha$,19-diol-3,20-dione. | $\Delta^4$-pregnene-$17\alpha$,19,$20\beta$-triol-3-one. |
| 17-acetate of $16\alpha$ methyl-$\Delta^4$-pregnene-$17\alpha$,19-diol-3,20-dione. | $16\alpha$-methyl-$\Delta^4$-pregnene-$17\alpha$,19,$20\beta$-triol-3-one. |

Example I

A suspension of 0.5 g. of 5% palladium on carbon catalyst in 50 cc. of methanol was hydrogenated for 30 minutes. A solution of 2 g. of the known 19-hydroxy testosterone in 200 cc. of methanol was added to the catalyst and stirred under a hydrogen atmosphere until the uptake of hydrogen ceased. After removal of the catalyst by filtration the solution was evaporated and the crude residue was purified by crystallization from methylene-chloride-hexane, thus giving androstane-17$\beta$,19-diol-3-one (Cpd. No. 1).

Example II

A solution of 1.1 molar equivalents of bromide in 10 cc. of glacial acetic acid was added dropwise with stirring to a solution of 1 g. of Compound No. 1 in 15 cc. of glacial acetic acid containing a few drops of hydrogen bromide in acetic acid. After 4 hours at room temperature, water was added and the crude amorphous dibromide was collected.

The total dibromo compound was refluxed for 90 minutes with 4.5 cc. of $\gamma$-collidine and 4.5 cc. of 2,4-lutidine under anhydrous conditions. The solution was cooled, the precipitate removed and the filtrate was diluted with ether, washed with dilute hydrocholoric acid, sodium carbonate solution and water. The dried extract was evaporated and the residue was chromatographed on neutral alumina. Crystallization of the fractions eluted with benzene from acetone-ether produced $\Delta^1$-androstene-17$\beta$,19-diol-3-one (Cpd. No. 2).

Example III

A solution of 5 g. of compound No. 2 in 350 cc. of methanol was treated while stirring with 20 cc. of a 4 N aqueous solution of sodium hydroxide and 20 cc. of 30% hydrogen peroxide, keeping the temperature at approximately 15° C. The solution was left at 0° C. overnight, then poured into ice water. The formed precipitate was filtered, washed with water and dried. Recrystallization from acetone-hexane gave 1$\alpha$,2$\alpha$-oxido-androstane-17$\beta$,19-diol-3-one (Cpd. No. 3).

Example IV

A mixture of 1 g. of compound No. 3, 4 cc. of pyridine and 2.1 molar equivalents of acetic anhydride was kept at 0° C. overnight, poured into ice water, the formed precipitate was filtered, washed with water and dried. Crystallization from acetone-hexane gave 1$\alpha$,2$\alpha$-oxido-androstane-17$\beta$,19-diol-3-one diacetate (Cpd. No. 4).

Example V 1 g. of compound No. 4 was dissolved in 50 cc. of anhydrous benzene, 1 cc. of boron trifluoride etherate recently distilled was added and the mixture refluxed for 1 hour the organic solution was washed with water, dried over anhydrous sodium sulfate and evaporated to dryness under vacuo. Chromatography of the residue on neutral alumina gave androstane-17$\beta$,19-diol-1,3-dione diacetate (Cpd. No. 5).

Example VI

A solution of 2 g. of sodium borohydride in 30 cc. of methanol was added with stirring to a solution of 2 g. of compound No. 4 in 40 cc. of tetrahydrofuran. The mixture was kept at 5° C. overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave androstane-1$\alpha$,3$\beta$,17$\beta$,19-tetrol 17,19-diacetate (Cpd. No. 6).

Example VII

A solution of 6 g. of compound No. 6 in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded androstane-17$\beta$, 19-diol-1,3-dione diacetate (Cpd. No. 5), identical with the compound obtained in Example V.

Example VIII

One gram of compound No. 5 was dissolved in 50 cc. of hot 95% ethanol and thereafter was added 1 g. of sodium hydroxide. The resulting mixture was refluxed for 4 hours, then it was cooled, poured into water and extracted with ethyl acetate. The organic solution was washed with water dried over anhydrous sodium sulfate and evaporated to dryness. Alumina chromatography afforded 2,19-cyclo-androstan-17$\beta$-ol-1,3-dione (Cpd. No. 7).

Example IX

The procedure described in Example VIII was repeated, except that sodium hydroxide was substituted by potassium hydroxide and the time of reflux was shortened to 3 hours, thus giving the same compound No. 7.

Example X

One gram of compound No. 7 was dissolved in 60 cc. of ethanol, thereto were added 5 g. of sodium hydroxide in 10 cc. of water and the whole was kept for 24 hours under reflux. The resulting mixture was then diluted with water and acidified with dilute hydrochloric acid, then extracted with methylene chloride. The organic extract was washed with water to neutral, dried over anhydrous sodium sulfate and evaporated to dryness. Crystallization of the residue from methanol-benzene afforded 10$\alpha$-androstan-17$\beta$-ol-3-one-19-oic acid (Cpd. No. 8).

Example XI

A solution of 2 mol equivalents of bromine in 15 cc. of glacial acetic acid was added dropwise to a solution of 1 g. of compound No. 8 in 25 cc. of acetic acid containing a few drops of 4 N hydrogen bromide in acetic acid. After five hours at room temperature, the mixture was poured into ice water and the precipitated dibromo derivative was collected, washed well with water, and dried. The dried material was refluxed for 14 hours with 2 g. of sodium in 40 cc. of ethyl methyl ketone and then kept at room temperature for an additional 12 hours. After dilution with water, the product was extracted with ether, washed with sodium thiosulfate solution and water, and the ether was removed under reduced pressure.

The crude residue dissolved in 35 cc. of acetone, was treated in an atmosphere of carbon dioxide with a solution of chromous chloride prepared from 11 g. of chromic chloride. After 20 minutes at room temperature, water was added, the mixture was extracted with ether, washed with water until neutral, dried and evaporated. The resulting residue was recrystallized from acetone hexane, thus giving $\Delta^4$-10$\alpha$-androsten-17$\beta$-ol-3-one-19-oic acid (Cpd. No. 9).

Example XII

The compounds set forth hereinafter under A, obtained according to Bowers U.S. patent application Ser. No. 201,802, filed June 12, 1962, or in accordance with Preparation 1, were treated following the procedure described in Example I, thus giving the corresponding products listed under B.

| A | Cpd. No. | B |
|---|---|---|
| Δ⁴-pregnen-19-ol-3,20-dione | 10 | Allopregnan-19-ol-3,20-dione. |
| 16α-methyl-Δ⁴-pregnen-19-ol-3,20-dione. | 11 | 16α-methyl-allopregnan-19-ol-3,20-dione. |
| 16β-methyl-Δ⁴-pregnen-19-ol-3,20-dione. | 12 | 16β-methyl-allopregnan-19-ol-3,20-dione. |
| 16α,17α-isopropylidenedioxy-Δ⁴-pregnen-19-ol-3,20-dione. | 13 | 16α,17α-isopropylidenedioxy-allopregnan-19-ol-3,20-dione. |
| 17α-acetoxy-Δ⁴-pregnen-19-ol-3,20-dione. | 14 | 17α-acetoxy-allopregnan-19-ol-3,20-dione. |
| 16α-methyl-17α-acetoxy-Δ⁴-pregnen-19-ol-3,20-dione. | 15 | 16α-methyl-17α-acetoxy-allopregnan-19-ol-3,20-dione. |
| 17,20;20,21-bismethylenedioxy-Δ⁴-pregnen-19-ol-3-one. | 16 | 17,20;20,21-bismethylenedioxy-allopregnan-19-ol-3-one. |
| 17α-methyl-Δ⁴-androstene-17β,19-diol-3-one. | 17 | 17α-methyl-androstane-17β,19-diol-3-one. |
| Δ⁴-pregnene-19,20β-diol-3-one. | 18 | allopregnane-19,20β-diol-3-one. |
| 16α-methyl-Δ⁴-pregnene-19,20β-diol-3-one. | 19 | 16α-methyl-allopregnane-19,20β-diol-3-one. |
| 16β-methyl-Δ⁴-pregnene-19,20β-diol-3-one. | 20 | 16β-methyl-allopregnane-19,20β-diol-3-one. |
| 16α,17α-isopropylidenedioxy-Δ⁴-pregnene-19,20β-diol-3-one. | 21 | 16α,17α-isopropylidenedioxy-allopregnane-19,20β-diol-3-one. |
| Δ⁴-pregnene-17α,19,20β-triol-3-one. | 22 | allopregnane-17α,19,20β-triol-3-one. |
| 16α-methyl-Δ⁴-pregnene-17α,19,20β-tiol-3-one. | 23 | 16α-methyl-allopregnane-17α,19,20β-triol-3-one. |

*Example XIII*

The compounds Nos. 10 to 23, inclusive, were treated according to Example II, thus yielding respectively.

Cpd. No.:
24. Δ¹-allopregnen-19-ol-3,20-dione
25. 16α-methyl-Δ¹-allopregnen-19-ol-3,20-dione
26. 16β-methyl-Δ¹-allopregnen-19-ol-3,20-dione
27. 16α,17α-isopropylidenedioxy-Δ¹-allopregnen-19-ol-3,20-dione
28. 17α-acetoxy-Δ¹-allopregnen-19-ol-3,20-dione
29. 16α-methyl-17α-acetoxy-Δ¹-allopregnen-19-ol-3,20-dione
30. 17,20;20,21-bismethylenedioxy-Δ¹-allopregnen-19-ol-3,20-dione
31. 17α-methyl-Δ¹-androstene-17β,19-diol-3-one
32. Δ¹-allopregnene-19,20β-diol-3-one
33. 16α-methyl-Δ¹-allopregnene-19,20β-diol-3-one
34. 16β-methyl-Δ¹-allopregnene-19,20β-diol-3-one
35. 16α,17α-isopropylidenedioxy-Δ¹-allopregnene-19,20β-diol-3-one
36. Δ¹-allopregnene-17α,19,20β-triol-3-one
37. 16α-methyl-Δ¹-allopregnene-17α,19,20β-triol-3-one

*Example XIV*

The compounds Nos. 24 to 37, inclusive, were treated according to Example II, thus yielding respectively.

Cpd. No.:
38. 1α,2α-oxido-allopregnan-19-ol-3,20-dione
39. 1α,2α-oxido-16α-methyl-allopregnan-19-ol-3,20-dione
40. 1α,2α-oxido-16β-methyl-allopregnan-19-ol-3,20-dione
41. 1α,2α-oxido-16α,17α-isopropylidenedioxy-allopregnan-19-ol-3,20-dione
42. 1α,2α-oxido-17α-acetoxy-allopregnan-19-ol-3,20-dione
43. 1α,2α-oxido-16α-methyl-17α-acetoxy-allopregnan-19-ol-3,20-dione
44. 1α,2α-oxido-17,20;20,21-bismethylenedioxy-allopregnan-19-ol-3-one
45. 1α,2α-oxido-17α-methyl-androstane-17β,19-diol-3-one
46. 1α,2α-oxido-allopregnane-19,20β-diol-3-one
47. 1α,2α-oxido-16α-methyl-allopregnane-19,20β-diol-3-one
48. 1α,2α-oxido-16β-methyl-allopregnane-19,20β-diol-3-one
49. 1α,2α-oxido-16α,17α-isopropylidenedioxy-allopregnane-19,20β-diol-3-one
50. 1α,2α-oxido-allopregnane-17α,19,20β-triol-3-one
51. 1α,2α-oxido-16α-methyl-allopregnane-17α,19,20β-triol-3-one

*Example XV*

The compounds Nos. 38 to 51, inclusive, were successively treated by the procedures described in Examples IV and V thus giving the first corresponding 19-acetates and 19,20-diacetates and then respectively.

Cpd. No.:
52. Allopregnan-19-ol-1,3,20-trione acetate
53. 16α-methyl-allopregnan-19-ol-1,3,20-trione acetate
54. 16β-methyl-allopregnan-19-ol-1,3,20-trione acetate
55. 16α,17α-isopropylidenedioxy-allopregnan-19-ol-1,3,20-trione acetate
56. 17α-acetoxy-allopregnan-19-ol-1,3,20-trione acetate
57. 16α-methyl-17α-acetoxy-allopregnan-19-ol-1,3,20-trione acetate
58. 17,20;20,21-bismethylenedioxy-allopregnan-19-ol-1,3-dione acetate
59. 17α-methyl-androstane-17β,19-diol-1,3-dione 19-acetate
60. Allopregnane-19,20β-diol-1,3-dione diacetate
61. 16α-methyl-allopregnane-19,20β-diol-1,3-dione diacetate
62. 16β-methyl-allopregnane-19,20β-diol-1,3-dione diacetate
63. 16α,17α-isopropylidenedioxy-allopregnane-19,20β-diol-1,3-dione diacetate
64. Allopregnane-17α,19,20β-triol-1,3-dione 19,20-diacetate
65. 16α-methyl-allopregnane-17α,19,20β-triol-1,3-dione 19,20-diacetate

*Example XVI*

The compounds Nos. 52 to 65, inclusive were treated according to Example VIII, thus yielding respectively.

Cpd. No.:
66. 2,19-cyclo-allopregnane-1,3,20-trione
67. 2,19-cyclo-16α-methyl-allopregnane-1,3,20-trione
68. 2,19-cyclo-16β-methyl-allopregnane-1,3,20-trione
69. 2,19-cyclo-16α,17α-isopropylidenedioxy-allopregnane-1,3,20-trione
70. 2,19-cyclo-17α-hydroxy-allopregnane-1,3,20-trione
71. 2,19-cyclo-16α-methyl-17α-hydroxy-allopregnane-1,3,20-trione
72. 2,19-cyclo-17,20;20,21-bismethylenedioxy-allopregnane-1,3-dione
73. 2,19-cyclo-17α-methyl-androstan-17β-ol-1,3-dione
74. 2,19-cyclo-allopreganan-20β-ol-1,3-dione
75. 2,19-cyclo-16α-methyl-allopregnan-20β-ol-1,3-dione
76. 2,19-cyclo-16β-methyl-allopregnan-20β-ol-1,3-dione
77. 2,19-cyclo-16α,17α-isopropylidenedioxy-allopregnan-20β-ol-1,3,-dione
78. 2,19-cyclo-allopregnan-17α,20β-diol-1,3-dione
79. 2,19-cyclo-16α-methyl-allopregnan-17α,20β-diol-1,3-dione

*Example XVII*

The compounds Nos. 66 to 79, inclusive were treated according to Example X, thus furnishing respectively.

Cpd. No.:
  80. 10α-allopregnane-3,20-dione-19-oic acid.
  81. 16α-methyl-10α-allopregnane-3,20-dione-19-oic acid.
  82. 16β-methyl-10α-allopregnane-3,20-dione-19-oic acid.
  83. 16α,17α-isopropylidenedioxy-10α-allopregnene-3,20-dione-19-oic acid.
  84. 17α-hydroxy-10α-allopregnane-3,20-dione-19-oic acid.
  85. 16α-methyl-17α-hydroxy-10α-allopregnane-3,20-dione-19-oic acid.
  86. 17,20;20,21-bismethylenedioxy-10α-allopregnane-3,20-dione-19-oic acid.
  87. 17α-methyl-10α-androstan-17β-ol-3-one-19-oic acid
  88. 10α-allopregnan-20β-ol-3-one-19-oic acid
  89. 16α-methyl-10α-allopregnan-20β-ol-3-one-19-oic acid
  90. 16β-methyl-10α-allopregnan-20β-ol-3-one-19-oic acid
  91. 16α,17α-isopropylidenedioxy-10α-allopregnan-20β-ol-3-one-19-oic acid
  92. 10α-allopregnan-17α,20β-diol-3-one-19-oic acid
  93. 16α-methyl-10α-allopregnan-17α,20β-diol-3-one-19-oic acid.

Example XVIII

The compounds Nos. 80 to 93, inclusive were treated according to Example XI, thus furnishing respectively.

Cpd. No.:
  94. Δ⁴-10α-pregnene-3,20-dione-19-oic acid
  95. 16α-methyl-Δ⁴-10α-pregnene-3,20-dione-19-oic acid
  96. 16β-methyl-π⁴-10α-pregnene-3,20-dione-19-oic acid
  97. 16α,17α-isopropylidenedioxy-Δ⁴-10α-pregnene-3,20-dione-19-oic acid
  98. 17α-hydroxy-Δ⁴-10α-pregnene-3,20-dione-19-oic acid.
  99. 16α-methyl-17α-hydroxy-Δ⁴-10α-pregnene-3,20-dione-19-oic acid.
  100. 17,20;20,21-bismethylenedioxy-Δ⁴-10α-pregnene-3,20-dione-19-oic acid
  101. 17α-methyl-Δ⁴-10α-androsten-17β-ol-3-one-19-oic acid
  102. Δ⁴-10α-pregnen-20β-ol-3-one-19-oic acid
  103. 16α-methyl-Δ⁴-10α-pregnen-20β-ol-3-one-19-oic acid
  104. 16β-methyl-Δ⁴-10α-pregnen-20β-ol-3-one-19-oic acid
  105. 16α,17α-isopropylidenedioxy-Δ⁴-10α-pregnen-20β-ol-3-one-19-oic acid
  106. Δ⁴-10α-pregnen-17α,20β-diol-3-one-19-oic acid
  107. 16α-methyl-Δ⁴-10α-pregnen-17α,20β-diol-3-one-19-oic acid

Example XIX

The compounds Nos. 7, 8 and 9 were treated according to Example IV, thus yielding respectively:

2,19-cyclo-androstan-17β-ol-1,3-dione acetate (Cpd. No. 108),
10α-androstan-17β-ol-3-one-19-oic acid acetate (Cpd. No. 109),
Δ⁴-10α-androsten-17β-ol-3-one-19-oic acid acetate (Cpd. No. 110).

Example XX

The starting compounds of Example XIX were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

Example XXI

To a solution of 5 g. of compound No. 72 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 2,19-cyclo-17α-methyl-androstan-17β-ol-1,3-dione caproate (Cpd. No. 111).

By the same procedure there were treated the compounds Nos.: 70, 71, 84, 85, 87, 98, 99 and 101, thus affording respectively.

Cpd. No.:
  112. 2,19-cyclo-allopregnan-17α-ol-1,3,20-trione caproate,
  113. 2,19-cyclo-16α-methyl-allopregnan-17α-ol-1,3,20-trione caproate,
  114. 10α-allopregnan-17α-ol-3,20-dione-19-oic acid caproate,
  115. 16α-methyl-10α-allopregnan-17α-ol-3,20-dione-19-oic acid caproate,
  116. 17α-methyl-10α-androstan-17β-ol-3-one-19-oic acid caproate,
  117. Δ⁴-10-pregnen-17α-ol-3,20-dione-19-oic acid caproate,
  118. 16α-methyl-Δ⁴-10α-pregnen-17α-ol-3,20-dione-19-oic acid caproate,
  119. 17α-methyl-Δ⁴-10α-androsten-17β-ol-3-one-19-oic acid caproate.

Example XXII

The starting compounds of Example XXI were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

Example XXIII 1 g. of compound No. 69 was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 2,19-cyclo-allopregnane-16α,17α-diol-1,3,20-trione (Cpd. No. 120).

The compounds Nos. 83 and 97, were treated by the same procedure, thus given respectively 10α-allopregnane-16α,17α-diol-3,20-dione-19-oic acid (Cpd. No. 121) and Δ⁴-10α-pregnene - 16α,17α - diol-3,20-dione-19-oic acid (Cpd. No. 122).

Example XXIV

A solution of 1 g. of compound No. 74 in 10 cc. of acetone was cooled to 0° C. and treated uner an atmosphere of nitrogen and with stirring, with a solution of 8N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 2,19-cyclo allopregnane-1,3,20-trione identical with the compound No. 66 disclosed in Example XVI.

When treating the compounds Nos. 75, 76, 77, 78, 79, 88, 102, 103, 104, 105, 106 and 107, by the above procedure, there were respectively obtained products identical with compounds Nos. 67, 68, 69, 70, 71, 80, 94, 95, 96, 97, 98, and 99.

I claim:
1. A compound of the following formula:

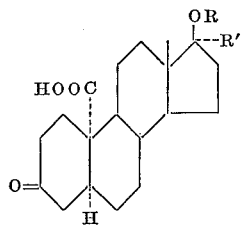

wherein R is selected from the group consisting of hydrogen and a hydrocarbon carboxylic acyl group of less than 12 carbon atoms and $R^1$ is selected from the group consisting of hydrogen and lower alkyl.

2. 10α-androstan-17β-ol-3-one-19-oic acid.
3. 17α - methyl - 10α - androstan-17β-ol-3-one-19-oic acid.
4. A compound of the following formula:

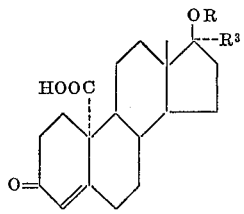

wherein R is selected from the group consisting of hydrogen and a hydrocarbon carboxylic acyl group of less than 12 carbon atoms and $R^3$ represents a lower alkyl group.

5. 17α - methyl $\Delta^4$ - 10α-androsten-17β-ol-3-one-19-oic acid.
6. A compound of the following formula:

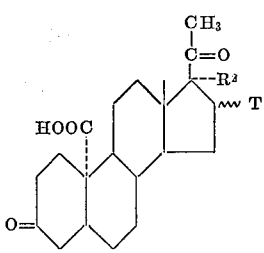

wherein $R^2$ is selected from the group consisting of hydrogen, hydroxyl and a hydrocarbon carboxylic acyloxy group of less than 12 carbon atoms, T is selected from the group consisting of hydrogen, α-methyl, β-methyl and α-hydroxyl, and $R^2$ and T together form the group

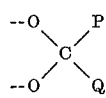

in the 16α,17α-positions wherein P and Q are selected from the group consisting of lower hydrocarbon residues of up to 8 carbon atoms.

7. 10α-allopregnan-17α-ol-3,20-dione-19-oic acid.
8. 16α - methyl-10α-allopregnan-17 - ol-3,20-dione-19-oic acid.

9. A compound of the following formula:

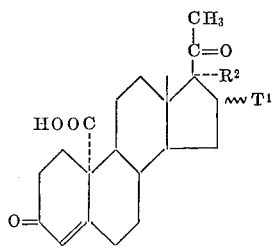

wherein $R^2$ is selected from the group consisting of hydrogen, hydroxyl and a hydrocarbon carboxylic acyloxy group of less than 12 carbon atoms, $T^1$ is selected from the group consisting of α-methyl, β-methyl and α-hydroxyl, and $R^2$ and $T^1$ together form the group

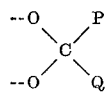

in the 16α,17α-positions wherein P and Q are selected from the group consisting of lower hydrocarbon residues of up to 8 carbon atoms.

10. 16α-methyl - $\Delta^4$ - 10α - pregnen-17α-ol-3,20-dione-19-oic acid.
11. A compound of the following formula:

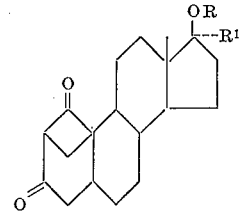

wherein R is a member of the group consisting of hydrogen and a hydrocarbon carboxylic acyl group of less than 12 carbon atoms; and $R^1$ is selected from the group consisting of hydrogen and lower alkyl.

12. 2,19-cyclo-androstan-17β-ol-1,3-dione.
13. 2,19 - cyclo-17α-methyl - androstan - 17β-ol-1,3-dione.
14. A compound of the following formula:

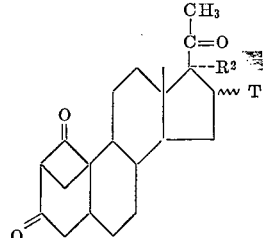

wherein $R^2$ is selected from the group consisting of hydrogen, hydroxyl and a hydrocarbon carboxylic acyloxy group of less than 12 carbon atoms; T is selected from the group consisting of hydrogen, α-methyl, β-methyl and α-hydroxyl; $R^2$ and T together form the group

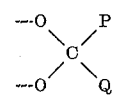

in the 16α,17α-positions wherein P and Q are selected from the group consisting of lower hydrocarbon residues of up to 8 carbon atoms.

15. 2,19-cyclo-allopregnan-17α-ol-1,3,20-trione.
16. 2,19-cyclo-16α-methyl-allopregnan - 17α-ol-1,3,20-trione.
17. A process for the production of 2,9-cyclo-1,3-diketo steroids selected from the group consisting of the androstane and pregnane series which comprises treating the corresponding 1,3-diketo-19-(hydrocarbon carboxylic acyloxy) steroid with a strong base.

18. The process of claim 17 wherein the strong base is an alkali metal hydroxide.

19. The process of claim 18 wherein the alkali metal hydroxide is sodium hydroxide.

20. The process of claim 18 wherein the alkali metal hydroxide is potassium hydroxide.

21. A process for the production of a 3-keto-10α-steroid-19-oic acid selected from the group consisting of the androstane and pregnane series, which comprises treating the corresponding 2,19-cyclo-1,3-diketo steroid with a strong basic medium.

22. The process of claim 21 wherein the strong basic medium is a concentrated solution of sodium hydroxide in water-ethanol, the reaction being carried out at reflux temperature for approximately 24 hours.

References Cited by the Examiner

UNITED STATES PATENTS 3,077,482   2/63   Wettstein et al. _____ 260—397.1

LEWIS GOTTS, *Primary Examiner.*